(12) United States Patent
Takeda

(10) Patent No.: US 10,035,288 B2
(45) Date of Patent: Jul. 31, 2018

(54) INJECTION MOLDING SYSTEM

(71) Applicant: FANUC Corporation, Yamanashi (JP)

(72) Inventor: Nobuto Takeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 218 days.

(21) Appl. No.: 15/182,596

(22) Filed: Jun. 15, 2016

(65) Prior Publication Data

US 2016/0368194 A1 Dec. 22, 2016

(30) Foreign Application Priority Data

Jun. 16, 2015 (JP) .................................. 2015-121420

(51) Int. Cl.
*B29C 45/84* (2006.01)
*B29C 45/73* (2006.01)
(Continued)

(52) U.S. Cl.
CPC .............. *B29C 45/73* (2013.01); *B29C 45/42* (2013.01); *B29C 45/03* (2013.01); *B29C 45/768* (2013.01); *B29C 45/84* (2013.01); *B29C 2945/76083* (2013.01); *B29C 2945/76163* (2013.01); *B29C 2945/76167* (2013.01); *B29C 2945/76464* (2013.01); *B29C 2945/76531* (2013.01); *B29C 2945/76568* (2013.01)

(58) Field of Classification Search
CPC ......... B29C 45/73; B29C 45/42; B29C 45/84; B29C 45/03; B29C 45/768; B29C 2945/76167; B29C 2945/76464; B29C 2945/76568; B29C 2945/76531; B29C 2945/76163; B29C 2945/76083
See application file for complete search history.

(56) References Cited

U.S. PATENT DOCUMENTS 4,555,228 A 11/1985 Nishiike et al.
8,070,993 B2 * 12/2011 Keys ................. B29C 45/14073
264/40.4
(Continued)

FOREIGN PATENT DOCUMENTS

DE 10357924 B3 7/2005
DE 202010000469 U1 6/2010
(Continued)

OTHER PUBLICATIONS

Office Action in JP Application No. 2015-121420, dated May 23, 2017.
(Continued)

*Primary Examiner* — Nahida Sultana
(74) *Attorney, Agent, or Firm* — Hauptman Ham, LLP

(57) ABSTRACT

Provided is an injection molding system that includes: a mounting position detection unit configured to detect a mounting position of a temperature control hose establishing connection from a mold temperature controller to a mold; and a temperature control hose attachment and detachment unit. Attachment and detachment of the temperature control hose is established by the temperature control hose attachment and detachment unit. By virtue of this feature, it is made possible to simplify the operator's tasks and achieve quick attachment and detachment of the temperature control hose in a short period of time.

12 Claims, 2 Drawing Sheets

(51) Int. Cl.
*B29C 45/42* (2006.01)
*B29C 45/80* (2006.01)
*B29C 45/76* (2006.01)
*B29C 45/78* (2006.01)
*B29C 45/03* (2006.01)

(56) References Cited

U.S. PATENT DOCUMENTS

| | | | |
|---|---|---|---|
| 2008/0195245 A1* | 8/2008 | Manda | B22D 17/32 |
| | | | 700/204 |
| 2010/0109183 A1* | 5/2010 | Kudo | B29C 45/7653 |
| | | | 264/40.5 |
| 2016/0239952 A1 | 8/2016 | Tanaka | |
| 2016/0311146 A1* | 10/2016 | Ichihara | B29C 45/1769 |
| 2016/0346979 A1* | 12/2016 | Uchiyama | B29C 45/7686 |
| 2017/0334116 A1* | 11/2017 | Iwakura | B29C 45/17 |

FOREIGN PATENT DOCUMENTS

| | | |
|---|---|---|
| DE | 102013014313 A1 | 3/2015 |
| JP | 58-222827 A | 12/1983 |
| JP | 2-65516 U | 5/1990 |
| JP | 4-86237 A | 3/1992 |
| JP | 7-32461 A | 2/1995 |
| JP | 7-178636 A | 7/1995 |
| JP | 7-290459 A | 11/1995 |
| JP | 8-34071 A | 2/1996 |
| JP | 10-44157 A | 2/1998 |
| JP | 2002-178378 A | 6/2002 |
| JP | 2002-370129 A | 12/2002 |
| JP | 2008-87187 A | 4/2008 |
| JP | 2015-87321 A | 5/2015 |
| WO | 2015/045834 A1 | 4/2015 |

OTHER PUBLICATIONS

Office Action in DE Application No. 102016007008.0, dated Mar. 7, 2018, 11pp.

* cited by examiner

INJECTION MOLDING SYSTEM

RELATED APPLICATIONS

The present application claims priority to Japanese Patent Application Number 2015-121420 filed Jun. 16, 2015, the disclosure of which is hereby incorporated by reference herein in its entirety.

BACKGROUND OF THE INVENTION

1. Field of the Invention

The present invention relates to an injection molding system. The present invention relates in particular to an injection molding system that places a temperature control hose in its position, the temperature control hose being adapted to supply a temperature control liquid for adjusting a temperature inside of a mold at the time of replacement of the mold.

2. Description of the Related Art

For production of a molded article in a stable manner by an injection molding machine, a temperature of a mold needs to be controlled with high accuracy in accordance with the characteristics of resin or any other relevant materials. For that purpose, generally a passage is provided that allows a temperature control liquid to flow in the mold, and the temperature control liquid is supplied from an external mold temperature controller or the like via a temperature control hose so that the temperature inside of the mold can be adjusted.

In this context, attachment and detachment operation of the temperature control hose and other relevant operations need to be performed every time the mold is replaced by another mold. In addition, since the mounting positions of molds vary depending on the specific types of the molds, it has been a cumbersome task to adjust the temperature control hose to correspond to the various mounting positions.

Detachment and connection of a hose or the like of this kind are generally performed by manual operation by an operator or performed using an automatic attachment/detachment type mold replacement system such as an automatic coupler.

According to the techniques disclosed in Japanese Patent Laid-Open No. 2002-178378, an L-shaped positioning block of a mold for production of an article is pressed against a temperature control concentration block of a platen, and thereby the positioning of the mold and the platen with respect to each other is performed. By virtue of this feature, a heat control pipe of a movable template and a heat control pipe of the temperature control concentration block are effectively and reliably connected to each other.

Japanese Patent Laid Open No. H10-44157 discloses a mold replacement system which connects a temperature control pipe and the like to a mold on this mold replacement system, and performs the replacement of the mold while this state is maintained.

Japanese Patent Laid Open No. H4-86237 discloses, as a mold temperature control mechanism for providing temperature control for a mold in an injection molding machine, techniques associated with automatically connecting a temperature control liquid supply device and a temperature control liquid passage to each other using an automatic connection mechanism.

Japanese Patent Laid Open No. 2002-178378 discloses positioning of the mold and the platen with respect to each other and subsequent connection of a hose from an external temperature controller. However, Japanese Patent Laid-Open No. 2002-178378 does not explicitly disclose specific features associated with how the hose is brought into its connected state. Even when it is assumed that an operator realizes the connected state by his/her manual operation or using a certain device therefor, it is necessary to provide a mold-side pipe opening at a connection opening of a fixed temperature control hose, which may compromise the flexibility of the mold design.

Japanese Patent Laid-Open No. H10-44157 discloses that the temperature control pipe is connected to the mold on the mold stage of the mold replacement system. However, Japanese Patent Laid-Open No. H10-44157 does not disclose the specific feature associated with how the temperature control pipe is brought into its connected state. As a result, it is necessary to provide a mold-side pipe opening at a connection opening of the mold stage of the mold replacement system, which may compromise the flexibility of design in the same or similar manner as in the case of the techniques disclosed in Japanese Patent Laid-Open No. 2002-178378.

Japanese Patent Laid-Open No. H4-86237 discloses techniques associated with typical automatic mold replacement system. However, an automatic mold replacement system is very expensive. Moreover, only one injection molding machine that is compatible with the specific automatic mold replacement system is allowed to be used with that system.

SUMMARY OF THE INVENTION

In view of the above, an object of the present invention is to make it possible to establish connection of a temperature control hose in an injection molding system without the need of using dedicated devices, simplify the operator's tasks, and achieve quick attachment and detachment of the temperature control hose in a short period of time.

The injection molding system in accordance with the present invention, which has an injection molding machine configured to provide temperature control for a mold so as to perform injection molding, includes a mold temperature controller configured to feed a temperature control medium for controlling a temperature of the mold; a temperature control hose configured to establish connection from the mold temperature controller to the mold; a mounting position detection unit configured to detect a mounting position of the temperature control hose in the mold; and a temperature control hose attachment and detachment unit configured to hold the temperature control hose and perform attachment and detachment operations so as to attach and detach the temperature control hose to and from the mold. The attachment and detachment of the temperature control hose to and from the mold is established by the temperature control hose attachment and detachment unit.

By virtue of this feature, it is made possible to simplify the operator's tasks and achieve the quick attachment and detachment of the temperature control hose in a short period of time. Also, since the specific operation patterns and specific shapes of the sections that hold pipes can be modified in accordance with the mold without the need of using a dedicated device for mold replacement, it is made possible to increase the flexibility in the mold design.

The injection molding system may further include a mounting position storage unit configured to store the mounting position detected by the mounting position detection unit, and the temperature control hose attachment and detachment unit may be configured to establish the attachment and detachment of the temperature control hose on the basis of the mounting position stored in the mounting position storage unit.

By virtue of this feature, since the mounting position is detected and stored in advance, it is made possible to achieve the attachment and detachment of the temperature control hose using the stored mounting position without relying upon detection thereof by a detection device during the attachment and detachment operation.

The injection molding system may further include a molding condition data storage unit. The molding condition data storage unit is configured to store molding condition data in an injection molding process and mounting position data indicative of the mounting position of the temperature control hose in the mold. The temperature control hose attachment and detachment unit may be configured to establish the attachment and detachment of the temperature control hose on the basis of the mounting position data.

By virtue of this feature, it is made possible to achieve the attachment and detachment of the temperature control hose on the basis of the specified mounting position data without the need of detection of the mounting position by the mounting position detection unit.

The mounting position detection unit may be configured as a camera that captures a moving image or a still image.

The temperature control hose attachment and detachment unit may be configured as a robot.

The temperature control hose attachment and detachment unit may also serve as a molded article extraction unit that is configured to extract a molded article from the mold.

By virtue of this feature, it is made possible to eliminate the need of independently providing the temperature control hose attachment and detachment unit and the molded article extraction unit and thereby simplify the configuration of the system.

The injection molding system may further include a pressure sensor configured to perform pressure measurement to detect a pressure of the temperature control medium. The pressure sensor is configured to output a temperature control medium evacuation complete signal to the temperature control hose attachment and detachment unit when the pressure of the temperature control medium becomes equal to or lower than a predetermined pressure. The temperature control hose attachment and detachment unit may be configured to attach and detach the temperature control hose after receiving the temperature control medium evacuation complete signal.

By virtue of this feature, it is made possible to detect any loss of the temperature control medium inside of the temperature control hose, prevent leakage of the temperature control medium, and achieve the attachment and detachment of the temperature control hose.

The injection molding system may further include a liquid leakage detection camera that is configured to perform liquid leakage check so as to check leakage of the temperature control medium. A liquid leakage signal is output to the injection molding machine when the leakage has been detected by the liquid leakage detection camera.

A color-changeable sheet whose color is changed by contact with liquid may be arranged at a position where a liquid is dropped when liquid leakage occurs so that the change in the color of the color-changeable sheet is detected by the liquid leakage detection camera.

By virtue of this feature, it is made possible to effectively and reliably detect a leakage of the temperature control medium at the time of the attachment and detachment of the temperature control hose. Also, since the color changeable sheet whose color is changed by contact with liquid is used and the change in the color of the color-changeable sheet is detected by the liquid leakage detection camera, it is made possible to more effectively and reliably detect the leakage of the temperature control medium even in a case where detection based on liquid as such is difficult.

The injection molding machine may be configured to stop the injection molding on the basis of reception of the liquid leakage signal and output a temperature control medium evacuation signal to the mold temperature controller.

By virtue of this feature, it is made possible to automatically stop the injection molding process in response to the detection of the leakage and achieve the evacuation of the temperature control medium.

The injection molding system may further include a connection unit that is configured to bundle a plurality of the temperature control hoses so that the temperature control hose attachment and detachment unit is configured to establish the connection of the temperature control hoses to the mold by the connection unit.

By virtue of this feature, it is made possible to collectively connect the multiple temperature control hoses to the mold.

A temperature control hose attachment and detachment instruction switch may be provided on an operation panel or an indicator of the injection molding machine so that the temperature control hose attachment and detachment unit performs the attachment and detachment of the temperature control hose to and from the mold on the basis of operation of the temperature control hose attachment and detachment instruction switch.

By virtue of this feature, it is made possible to readily provide the instruction to attach and detach the temperature control hose.

The injection molding system may further include a temperature control hose holding stand configured to hold the temperature control hose removed by the temperature control hose attachment and detachment unit.

By virtue of this feature, it is made possible to hold the temperature control hose that has been removed in a predetermined place, and it is also made possible to effectively and reliably remove and attach the temperature control hose in the subsequent attachment of the temperature control hose.

The present invention makes it possible to establish the connection of the temperature control hose in the injection molding system without the need of using any dedicated devices, simplify the operator's tasks, and achieve quick attachment and detachment of the temperature control hose in a short period of time.

BRIEF DESCRIPTION OF THE DRAWINGS

These and other objects and features of the present invention will become apparent from the following explanations of embodiments with reference to the attached drawings, in which.

DETAILED DESCRIPTION OF THE PREFERRED EMBODIMENTS

Figure 1:
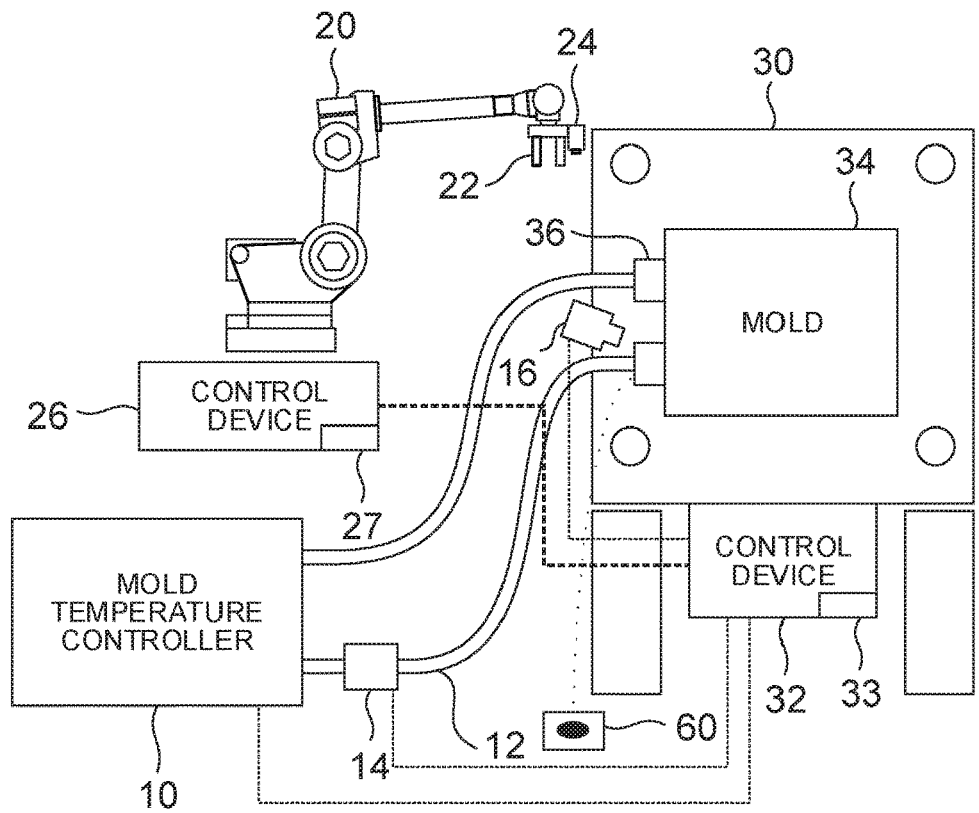
FIG. 1 is a diagram illustrating a configuration of an injection molding system according to an embodiment.

The embodiment of the present invention is described below with reference to the drawings. FIG. 1 is a diagram that illustrates the configuration of an injection molding system according to this embodiment. An injection molding machine 30 includes a control device 32 configured to control the operation of the injection molding machine 30 and a mold 34 for production of a molded article. A storage unit 33 is provided inside of the control device 32. The storage unit 33 is configured to store molding condition data and the like associated with the injection molding process. Also, the mold temperature controller 10 is configured to adjust a temperature of a temperature control medium so as to adjust a temperature of the mold 34 and is configured to supply the temperature control medium via a temperature control hose 12 to the mold 34. While water is generally used as the temperature control medium, it is also possible to use oil depending on the specified temperature. The temperature control hose 12 and the mold 34 are connected to each other via a coupler 36. A pressure sensor 14 is attached to the temperature control hose 12. The pressure sensor 14 is configured to detect a pressure of the temperature control medium inside of the temperature control hose 12.

There is provided a robot 20 that includes at its end portion a hand 22 and a position detection camera 24. There is also provided a robot control device 26 which is a device configured to control the operation of the robot 20. The robot control device 26 is connected to the injection molding machine control device 32 and configured to exchange information with the injection molding machine control device 32. Also, inside of the robot control device 26, there is provided a robot storage unit 27 configured to store a mounting position and the like of the temperature control hose 12. The reference sign 16 denotes a liquid leakage detection camera. The liquid leakage detection camera 16 is configured to capture an image of a portion including and extending around the connection section of the temperature control hose 12 and the mold 34 and is configured to check occurrence of leakage of the temperature control medium. The liquid leakage detection camera 16 may be mounted at the end portion of the robot 20 or on a stand that is separated from the robot 20 and thus configured to capture the image of the portion including and extending around the connection section of the temperature control hose 12 and the mold 34.

In the injection molding system having the above described configuration, the temperature control hose 12 is connected to the coupler 36 of the mold 34 using the hand 22 provided at the end portion of the robot 20. At the time of the connection operation, the mounting position of the temperature control hose 12 is checked using the position detection camera 24 that is provided at the end portion of the robot 20 along with the hand 22 while the connection operation is performed. It may also be contemplated that, in place of checking the mounting position of the temperature control hose 12 by the position detection camera 24 for the connection operation, the mounting position of the temperature control hose 12 is checked in advance by the position detection camera 24; the mounting position that has been checked is stored in the robot storage unit 27 inside of the robot control device 26; and the connection operation of the temperature control hose 12 is performed by reading, at the time of the connection operation, the mounting position stored in the robot storage unit 27. Further, the mounting position may be checked by an operator specifying the position for the robot 20 without using the position detection camera 24.

Also, a configuration may be contemplated according to which mounting position data is stored as well as the molding condition data for the injection molding process in the injection molding machine storage unit 33 of the injection molding machine control device 32 and the mounting position data stored in the injection molding machine storage unit 33 is read therefrom when the connection of the temperature control hose 12 is to be established. The mounting position data stored in the injection molding machine storage unit 33 along with the molding condition data may be captured in advance by the position detection camera 24 and stored in the injection molding machine storage unit 33, or may be given as data without capturing by the position detection camera 24 and thus stored along with the molding condition data in the injection molding machine storage unit 33.

Also, the hand 22 for use in establishing the connection of the temperature control hose 12 can be used as a molded article extraction unit that extracts the molded article produced by the mold 34 during the injection molding operation. In that case, a shared hand 22 may be used. Alternatively, a hand for use in attachment and detachment of the temperature control hose 12 and another hand for use in extraction of the molded article to extract the molded article may be juxtaposedly provided at an end portion of the robot 20 so as to perform the attachment and detachment of the temperature control hose 12 and the extraction of the molded article.

The pressure sensor 14 is configured to measure the pressure of the temperature control medium inside of the temperature control hose 12 and check whether or not feeding of the temperature control medium from the mold temperature controller 10 to the mold 34 and recovery of the temperature control medium from the mold 34 are properly performed. Also, when the temperature control hose 12 connected to the mold 34 is to be removed therefrom, it is necessary to evacuate the temperature control medium inside of the temperature control hose 12 therefrom. The pressure of the temperature control medium inside of the temperature control hose 12 is detected by the pressure sensor 14 at the time of the evacuation of the temperature control medium as well. When it is detected that the pressure has become equal to or less than a predetermined pressure value, an evacuation complete signal is output to the robot control device 26. The robot 20 performs the removal of the temperature control hose 12 after having received the evacuation complete signal. With regard to outputting of the evacuation complete signal, it may be contemplated that the evacuation complete signal is to be output when a predetermined time has elapsed since the pressure detected by the pressure sensor 14 became equal to or lower than a predetermined pressure value. According to this configuration, it is made possible to output the evacuation complete signal more reliably in a state where the evacuation of the temperature control medium out of the temperature control hose 12 is completed.

The liquid leakage detection camera 16 is configured to capture an image of a region including the connection section and extending near this connection section connecting the temperature control hose 12 to the mold 34 and thereby check occurrence of any leakage of the temperature control medium. When a leakage of the temperature control medium has been detected by the liquid leakage detection camera 16, the liquid leakage detection camera 16 outputs a liquid leakage signal to the injection molding machine control device 32. When the injection molding machine 30 has received the liquid leakage signal, the injection molding machine 30 stops the injection molding operation and outputs to the mold temperature controller 10 a temperature control medium evacuation signal for evacuation of the temperature control medium. When the mold temperature controller 10 has received the temperature control medium evacuation signal, the mold temperature controller 10 stops feeding of the temperature control medium to the mold 34 and performs the evacuation operation to evacuate the temperature control medium.

Also, a color-changeable sheet 60 whose color is changed by contact with liquid may be arranged at a position where the temperature control medium drops from any region near the connection section connecting the temperature control hose 12 to the mold 34. As the color-changeable sheet 60, for example, a cobalt chloride sheet whose color is changed from blue to red by contact with liquid may be used. In this manner, detection of the liquid leakage may be performed by capturing the image of the color changeable sheet 60 and detecting the color change instead of capturing by the liquid leakage detection camera 16 a leakage of the temperature control medium itself as such at a region including and extending around the connection section connecting the temperature control hose 12 to the mold 34. According to this configuration, it is made possible to effectively and reliably detect the liquid leakage on the basis of the detection of the color-changeable sheet particularly even when a transparent medium such as water is used as the temperature control medium and it is not easy to detect the liquid leakage by the liquid leakage detection camera 16 or in any other similar cases.

It should be noted that, although the liquid leakage detection camera 16 and the position detection camera 24 are provided as two independent cameras in this embodiment, the liquid leakage of the temperature control medium may be detected by the position detection camera 24 by moving the position detection camera 24 to be close to the region including and extending around the connection section connecting the temperature control hose 12 to the mold 34.

Figure 2:
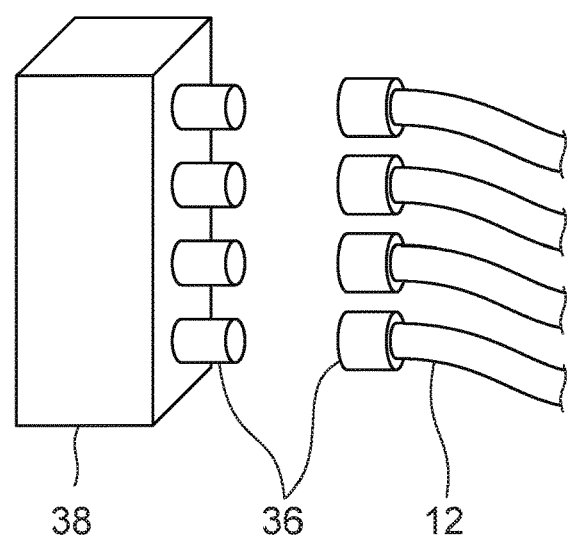
FIG. 2 is a diagram illustrating another mode of an attachment and detachment unit for attachment and detachment of a temperature control hose to and from a joint.

FIG. 2 is a diagram that illustrates another mode of the attachment and detachment unit for the attachment and detachment of the temperature control hose to and from the joint. In this example, multiple temperature control hoses 12 are connected to a seat 38 using couplers 36. The robot 20 may also be used to connect the temperature control hoses 12 to the seat 38. In this case, the seat 38 is connected to the mold 34 by the robot 20 after the temperature control hoses 12 have been connected to the seat 38. According to this configuration, since the multiple temperature control hoses 12 are in advance bundled by the seat 38, it is made possible to connect the multiple temperature control hoses 12 by one single attachment operation.

Figure 3:
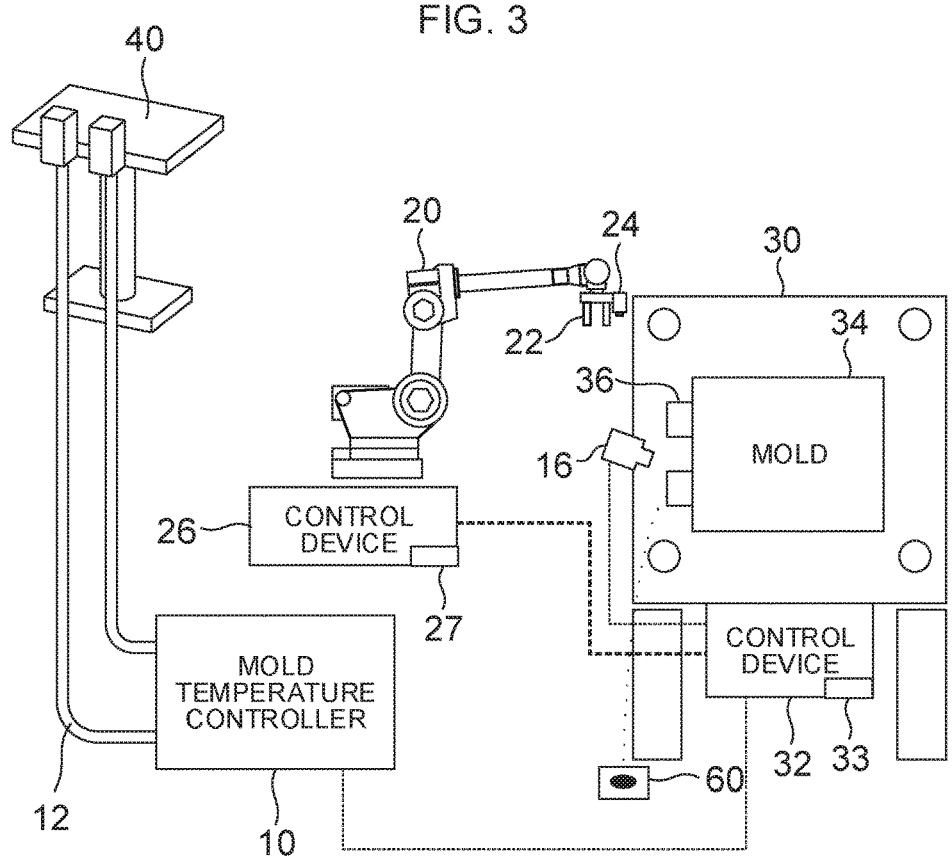
FIG. 3 is a diagram illustrating a state where the temperature control hose is detached in the embodiment.

FIG. 3 is a diagram that illustrates a state where the temperature control hose 12 is placed in its detached state in the injection molding system illustrated in FIG. 1. When the temperature control hose 12 is removed by the robot 20, it is ensured that the temperature control hose 12 is placed upon a temperature control hose holding stand 40. By this arrangement, it is made possible to hold the temperature control hose 12 that has been removed at a predetermined place. In addition, when the temperature control hose 12 is subsequently attached again, it is made possible for the robot 20 to effectively and reliably take out and mount the temperature control hose 12.

Figure 4:
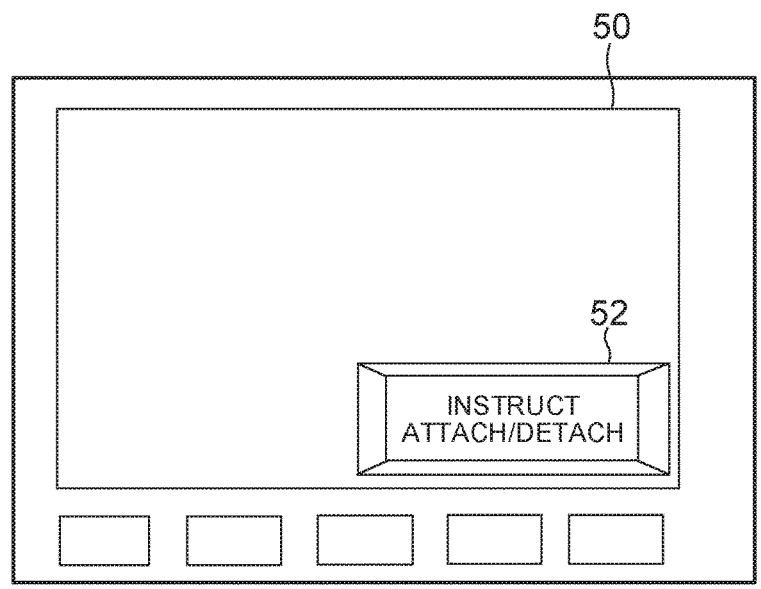
FIG. 4 is a diagram illustrating an operation panel provided on an injection molding machine.

FIG. 4 is a diagram that illustrates an operation panel 50 provided on the injection molding machine 30. The operation panel 50 is constituted by a touch panel and an attachment/detachment instruction button 52 is displayed on the operation panel 50. When the operator presses the attachment/detachment instruction button 52, an attachment/detachment instruction is output to the robot control device 26. When the attachment/detachment instruction has been received by the robot 20, the robot 20 performs either the mounting operation to mount the temperature control hose 12 in a case where the temperature control hose 12 is not connected to the mold 34 or the attachment and detachment operation to remove the temperature control hose 12 in a case where the temperature control hose 12 is connected to the mold 34.

It should be noted that, although the robot 20 is used as the temperature control hose attachment and detachment unit in these embodiments, other devices may be used. Meanwhile, if the robot 20 is used, the operation pattern and the shape of the portion that holds the temperature control hose can be modified in accordance with the mold, so that it is possible to increase the flexibility of the design. Also, when the robot 20 has the feature of moving between devices, it is made possible to make one single robot perform the attachment and detachment operation to remove the temperature control hose for multiple injection molding machines, which makes it possible to configure a replacement system that replaces the temperature control hose in a cost-effective manner. Also, in these embodiments, one single robot is engaged in the attachment and detachment operation to remove the temperature control hose, but the attachment and detachment operation may be performed using multiple robots.

It is also possible to use a collaborative robot as the robot. Force sensors and the like are attached to the relevant portions of the collaborative robot, and the results of the detection by the force sensors are connected to the control device of the collaborative robot. When the operator touches the collaborative robot and the detected value of any of the force sensor exceeds a predetermined threshold, then the control device either stops the collaborative robot or causes the collaborative robot to operate such that the detected value of the force sensor becomes smaller. By virtue of this feature, the collaborative robot is prevented from exerting an excessive force upon the operator.

By using collaborative robot of this type, the operator who is staying close by the robot is allowed to check the occurrence of the liquid leakage from the temperature control hose while the robot performs the attachment and detachment operation to remove the temperature control hose, which makes it possible to efficiently perform the attachment and detachment operation to remove the temperature control hose.

The invention claimed is:

1. An injection molding system including an injection molding machine configured to provide temperature control for a mold so as to perform injection molding, the injection molding system comprising:
   a mold temperature controller configured to feed a temperature control medium for controlling a temperature of the mold;
   a temperature control hose configured to establish connection from the mold temperature controller to the mold;
   a mounting position detection unit configured to detect a mounting position of the temperature control hose in the mold; and a temperature control hose attachment and detachment unit, which is a robot, configured to hold the temperature control hose and perform attachment and detachment operations so as to attach and detach the temperature control hose to and from the mold, the attachment and detachment of the temperature control hose to and from the mold being established by the temperature control hose attachment and detachment unit.

2. The injection molding system according to claim 1, further comprising a mounting position storage unit configured to store the mounting position detected by the mounting position detection unit, wherein the temperature control hose attachment and detachment unit is configured to establish the attachment and detachment of the temperature control hose on the basis of the mounting position stored in the mounting position storage unit.

3. The injection molding system according to claim 1, further comprising a molding condition data storage unit, the molding condition data storage unit being configured to store molding condition data in an injection molding process and mounting position data indicative of the mounting position of the temperature control hose in the mold, wherein the temperature control hose attachment and detachment unit is configured to establish the attachment and detachment of the temperature control hose on the basis of the mounting position data.

4. The injection molding system according to claim 1, wherein the mounting position detection unit is a camera configured to capture a moving image or a still image.

5. The injection molding system according to claim 1, wherein the temperature control hose attachment and detachment unit also serves as a molded article extraction unit configured to extract a molded article from the mold.

6. The injection molding system according to claim 1, further comprising a pressure sensor configured to perform pressure measurement to detect a pressure of the temperature control medium, the pressure sensor being configured to output a temperature control medium evacuation complete signal to the temperature control hose attachment and detachment unit in response to the pressure of the temperature control medium becoming equal to or lower than a predetermined pressure, wherein the temperature control hose attachment and detachment unit is configured to remove the temperature control hose after receiving the temperature control medium evacuation complete signal.

7. The injection molding system according to claim 1, further comprising a liquid leakage detection camera configured to perform liquid leakage check so as to check leakage of the temperature control medium, wherein a liquid leakage signal is output to the injection molding machine in response to the leakage being detected by the liquid leakage detection camera.

8. The injection molding system according to claim 7, wherein a color-changeable sheet whose color is changed by contact with liquid is arranged at a position where a liquid is dropped when liquid leakage occurs, and the change in the color of the color-changeable sheet is detected by the liquid leakage detection camera.

9. The injection molding system according to claim 7, wherein the injection molding machine is configured to stop the injection molding on the basis of reception of the liquid leakage signal and output a temperature control medium evacuation signal to the mold temperature controller.

10. The injection molding system according to claim 1, further comprising a connection unit configured to bundle a plurality of the temperature control hoses, wherein the temperature control hose attachment and detachment unit is configured to establish the connection of the plurality of temperature control hoses to the mold by the connection unit.

11. The injection molding system according to claim 1, further comprising a temperature control hose attachment and detachment instruction switch on an operation panel or an indicator of the injection molding machine, wherein the temperature control hose attachment and detachment unit establishes the attachment and detachment of the temperature control hose to and from the mold on the basis of operation of the temperature control hose attachment and detachment instruction switch.

12. The injection molding system according to claim 1, further comprising a temperature control hose holding stand configured to hold the temperature control hose removed by the temperature control hose attachment and detachment unit.

* * * * *